United States Patent
Nishimura

(10) Patent No.: US 10,496,232 B2
(45) Date of Patent: Dec. 3, 2019

(54) CAPACITIVE TOUCH PANEL

(71) Applicant: NISSHA CO., LTD., Kyoto (JP)

(72) Inventor: Takeshi Nishimura, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 0 days.

(21) Appl. No.: 16/373,652

(22) Filed: Apr. 3, 2019

(65) Prior Publication Data

US 2019/0227672 A1 Jul. 25, 2019

Related U.S. Application Data

(63) Continuation of application No. PCT/JP2017/039900, filed on Nov. 6, 2017.

(30) Foreign Application Priority Data

Jan. 23, 2017 (JP) .................................. 2017-009370

(51) Int. Cl.
*G06F 3/041* (2006.01)
*G06F 3/045* (2006.01)
(Continued)

(52) U.S. Cl.
CPC ............ *G06F 3/0448* (2019.05); *G06F 3/047* (2013.01); *G06F 2203/04104* (2013.01)

(58) Field of Classification Search
CPC ....... G06F 3/044; G06F 3/0412; G06F 3/0416
See application file for complete search history.

(56) References Cited

U.S. PATENT DOCUMENTS

| 2014/0002378 A1* | 1/2014 | Kim ..................... G06F 3/041 345/173 |
| 2014/0184939 A1* | 7/2014 | Lai ..................... G06F 3/044 349/12 |
| 2018/0120986 A1* | 5/2018 | Miyazaki ............... G06F 3/044 |

FOREIGN PATENT DOCUMENTS

| JP | 2008-129708 A | 6/2008 |
| JP | 2013-93014 A | 5/2013 |

(Continued)

OTHER PUBLICATIONS

International Search Report dated Dec. 19, 2017, for PCT/JP2017/039900 filed on Nov. 6, 2017, 6 pages including English Translation.

(Continued)

*Primary Examiner* — Nan-Ying Yang
(74) *Attorney, Agent, or Firm* — Xsensus LLP

(57) ABSTRACT

A capacitive touch panel including: a single transparent substrate; a first electrode pattern formed on a first surface of the transparent substrate; a first dummy electrode pattern including a plurality of first dummy electrodes and formed on a region where the first electrode pattern is not formed; a second electrode pattern formed on a second surface of the transparent substrate; and a second dummy electrode pattern including a plurality of second dummy electrodes and formed on a region where the second electrode pattern is not formed, the first/second dummy electrodes are electrically insulated from the first/second electrode pattern by slits respectively, the slits of the second/first dummy electrodes include outermost first/third gaps and second/fourth gaps disposed inward of the first/third gaps respectively, and the third/second gaps and the fourth/first gaps are patterned to overlap each other in a plurality of dotted regions in a plan view.

12 Claims, 20 Drawing Sheets

(51) Int. Cl.
*G06F 3/044* (2006.01)
*G06F 3/047* (2006.01)

(56) References Cited

FOREIGN PATENT DOCUMENTS

| | | |
|---|---|---|
| JP | 2015-207144 A | 11/2015 |
| JP | 2015-210600 A | 11/2015 |

OTHER PUBLICATIONS

Notification of Reasons for Refusal received for Japanese Patent Application No. 2017-009370, dated Oct. 2, 2018, 6 pages including English Translation.

Decision to Grant a Patent received for Japanese Patent Application No. 2017-009370, dated Jan. 15, 2019, 6 pages including English Translation.

* cited by examiner

CAPACITIVE TOUCH PANEL

CROSS REFERENCES TO RELATED APPLICATIONS

This application is a continuation of International Application No. PCT/JP2017/039900, filed on Nov. 6, 2017, which claims priority to Japanese Patent Application 2017-009370, filed on Jan. 23, 2017, which is incorporated herein by reference.

TECHNICAL FIELD

The present disclosure relates to a capacitive touch panel.

BACKGROUND

In general, a capacitive touch panel includes a plurality of first transparent electrodes and a second transparent electrodes, which are disposed to face each other, and the respective transparent electrodes are formed on both surfaces of one transparent film or on respective one-sided surfaces of two transparent films.

Moreover, a touch panel is known, in which dummy electrodes are provided between a plurality of transparent electrodes of the same type in a planar direction (refer to PTL 1). By the dummy electrodes, a difference in light transmittance between portions where the transparent electrodes are arranged and other portions is reduced, and hence, the transparent electrodes become less likely to be visually recognized. Note that the dummy electrodes are generally divided in a plurality of minute regions in order to reduce parasitic capacitance.

CITATION LIST

Patent Literature

PTL 1: JP 2008-129708 A

SUMMARY

Technical Problem

As materials of a transparent conductive film formed on a transparent substrate, tin oxide ($SnO_2$), indium tin oxide (ITO) and zinc oxide (ZnO) have heretofore been known.

In recent years, as a material of the transparent conductive film, a metal nanowire has been researched. Since the metal nanowire has a small diameter, light transmittance thereof in the visible spectrum is high, and as an alternative to ITO, the metal nanowire is expected to be applied as the transparent conductive film. There is a silver nanowire as an example of the metal nanowire (AgNW).

The inventor of the present application has paid attention to the fact that the following problem may occur in a capacitive touch panel using a transparent conductive film that has transparent electrodes made of the silver nanowire.

That is, primarily, the silver nanowire has a whitish reflected color, and therefore, when a display is turned off and becomes a black screen, such a display screen sometimes looks white through the touch panel. Particularly, a section from which the silver nanowire is removed by patterning becomes transparent, and accordingly, a pattern may sometimes appear by contrast between portions where the silver nanowire is present and not present.

Moreover, for example, in a region where a boundary between one electrode pattern and a dummy electrode pattern; and a boundary between another electrode pattern and another dummy electrode pattern overlap each other in a plan view, gaps between the respective boundaries overlap each other, whereby sections and area of "portions where an electrode material is not formed in a plan view" may sometimes be increased.

An object of the present disclosure is to reduce the appearance of the pattern in the capacitive touch panel.

Solution to Problem

Some aspects are described below as the means to solve the problems. These aspects can be combined optionally, as needed.

A capacitive touch panel according to an aspect of the present disclosure includes: a single transparent substrate or a combination of a first transparent substrate and a second transparent substrate; a first electrode pattern; a first dummy electrode pattern; a second electrode pattern; and a second dummy electrode pattern.

The first electrode pattern is formed on a first surface of the transparent substrate or on one surface of the first transparent substrate.

The first dummy electrode pattern including a plurality of first dummy electrodes is formed on the first surface of the transparent substrate or on the one surface of the first transparent substrate.

The second electrode pattern is formed on a second surface of the transparent substrate or on one surface of the second transparent substrate.

The second dummy electrode pattern including a plurality of second dummy electrodes is formed on the second surface of the transparent substrate or on the one surface of the second transparent substrate.

The second dummy electrode pattern includes cover portions corresponding to edge portions of the plurality of first dummy electrodes of the first dummy electrode pattern, whereby portions where none of the first electrode pattern, the second electrode pattern, the first dummy electrode pattern, and the second dummy electrode pattern are formed in a plan view are reduced. Note that "to cover" refers to a state where the cover portions correspond to the edge portions in a plan view and are further present also on a periphery of the edge portion.

In this touch panel, portions where none of the first electrode pattern, the second electrode pattern, the first dummy electrode pattern, and the second dummy electrode pattern are formed (hereinafter the portions will be referred to as "portions where no electrode material is formed in a plan view") can be reduced, whereby the appearance of the pattern is reduced.

In the capacitive touch panel,
the edge portions of plurality of first dummy electrodes are linear, and
edge portions of the plurality of second dummy electrodes constitute the cover portions by peripheries of diagonal shape portions corresponding to the edge portions of the plurality of first dummy electrodes, and the cover portions may cover the edge portions of the plurality of first dummy electrodes.

In this touch panel, the edge portions of the second dummy electrodes include the plurality of diagonal shape portions constituting the cover portions. Accordingly, even if the edge portions deviate from each other due to an error in pasting, the portions where no electrode material is formed in a plan view remains to be a plurality of dots. That is, the above-described portions do not appear as lines.

The first electrode pattern and the second electrode pattern may be rhombic.

The first dummy electrodes and the second dummy electrodes may be rhombic.

Outermost ones of a plurality of minute portions of the plurality of first dummy electrodes may include first gaps with adjacent first electrode pattern and second gaps disposed parallel to and inward of the first gaps.

Outermost ones of a plurality of minute portions of the plurality of second dummy electrodes may include third gaps with adjacent second electrode pattern and fourth gaps disposed parallel and inward of the third gaps.

Each of the first gaps and the second gaps may be linear.

The third gaps and the fourth gaps may be plural and diagonal, peripheries of the third gaps and the fourth gaps may constitute the cover portions, and the cover portions may individually cover the first gaps and second gaps of the plurality of first dummy electrodes, The plurality of first dummy electrodes may include a plurality of fifth gaps extending between the first gaps and the second gaps.

The plurality of second dummy electrodes includes a plurality of sixth gaps. The plurality of sixth gaps extend between the third gaps and the fourth gaps and are formed at intermediate positions between the plurality of fifth gaps. Portions between the plurality of sixth gaps constitute cover portions, by which the plurality of fifth gaps are covered.

In this touch panel, the third gaps and fourth gaps of the second dummy electrodes constitute the plurality of diagonal shape portions, by which, as the cover portions, the first gaps and second gaps of the plurality of first dummy electrodes are covered, and further, the portions between the plurality of sixth gaps of the second dummy electrodes constitute the cover portion, by which the plurality of fifth gaps of the plurality of first dummy electrodes are covered.

A capacitive touch panel according to another aspect of the present disclosure includes: a single transparent substrate or a first transparent substrate and a second transparent substrate; a first electrode pattern; a second electrode pattern; and a dummy electrode pattern.

The first transparent substrate and the second transparent substrate are adhered to each other.

The first electrode pattern is formed on a first surface of the transparent substrate or on one surface of the first transparent substrate and includes a plurality of first electrodes.

The second electrode pattern is formed on a second surface of the transparent substrate or on one surface of the second transparent substrate and includes a plurality of second electrodes.

The dummy electrode pattern is formed on the second surface of the transparent substrate or on the one surface of the second transparent substrate and includes a plurality of dummy electrodes.

The plurality of dummy electrodes include cover portions corresponding to a plurality of gaps between the plurality of first electrodes of the first electrode pattern, whereby the portions where none of the first electrode pattern, the second electrode pattern, and the dummy electrode pattern are formed are reduced.

In this touch panel, the portions where no electrode material is formed in a plan view can be reduced, whereby the appearance of the pattern is reduced.

The plurality of gaps between the plurality of first electrodes may be linear.

The plurality of gaps between the plurality of dummy electrodes may include a plurality of diagonal gaps corresponding to gaps between the plurality of first electrodes, peripheries of the plurality of diagonal gaps may constitute the cover portions, and the cover portions may cover gaps between the plurality of first electrodes.

In this touch panel, the plurality of gaps between the dummy electrodes include the plurality of diagonal shape portions constituting the cover portions. Accordingly, even if the gaps deviate from one another due to an error in pasting, the portions where no electrode material is formed in a plan view remains to be a plurality of dots. That is, the above-described portions do not appear as lines.

The plurality of gaps between the plurality of first electrodes may be linear.

In the plurality of dummy electrodes, the gaps between the plurality of first electrodes and the portions corresponding to both sides of the gaps may constitute the cover portions, and the cover portions may cover the gaps between the plurality of first electrodes.

In this touch panel, the portions between the plurality of gaps of the plurality of dummy electrodes serve as the cover portions and cover the gaps between the plurality of first electrodes. Accordingly, the portions where no electrode material is formed in a plan view are reduced.

Advantageous Effects of Disclosure

In the capacitive touch panel according to the present disclosure, the appearance of the pattern is reduced.

DETAILED DESCRIPTION

1. First Embodiment (1) Basic Configuration of Touch Panel

Figure 1:
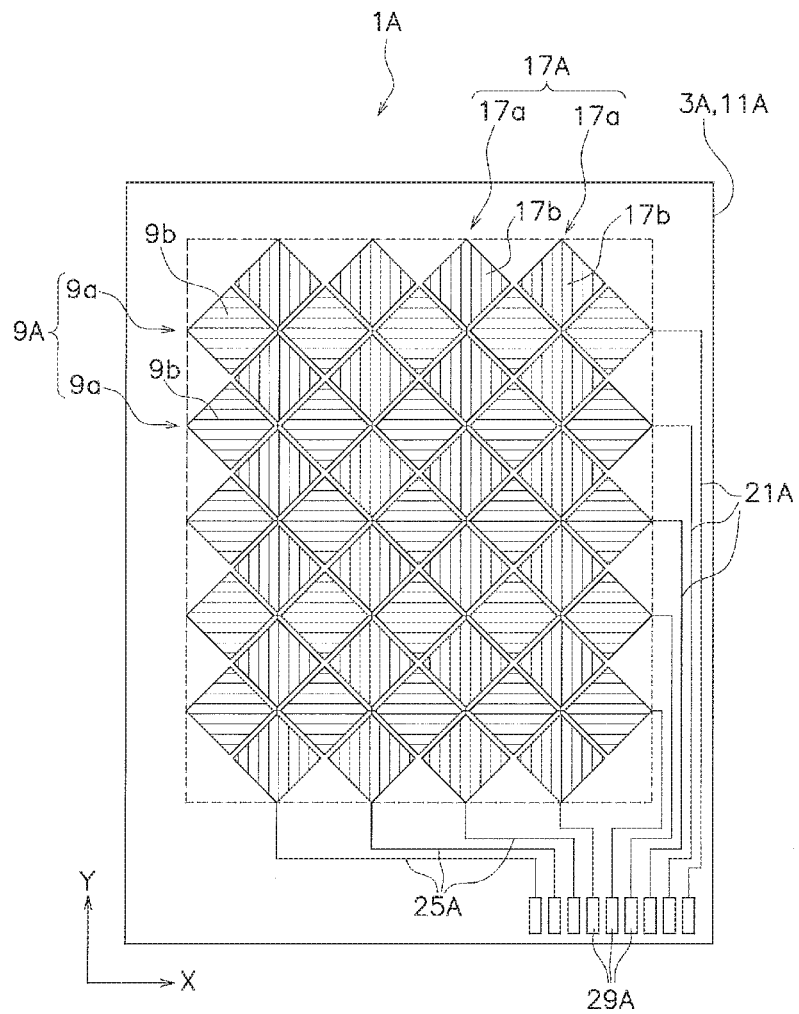
FIG. 1 is a schematic plan view of a touch panel according to a first embodiment.
Figure 2:
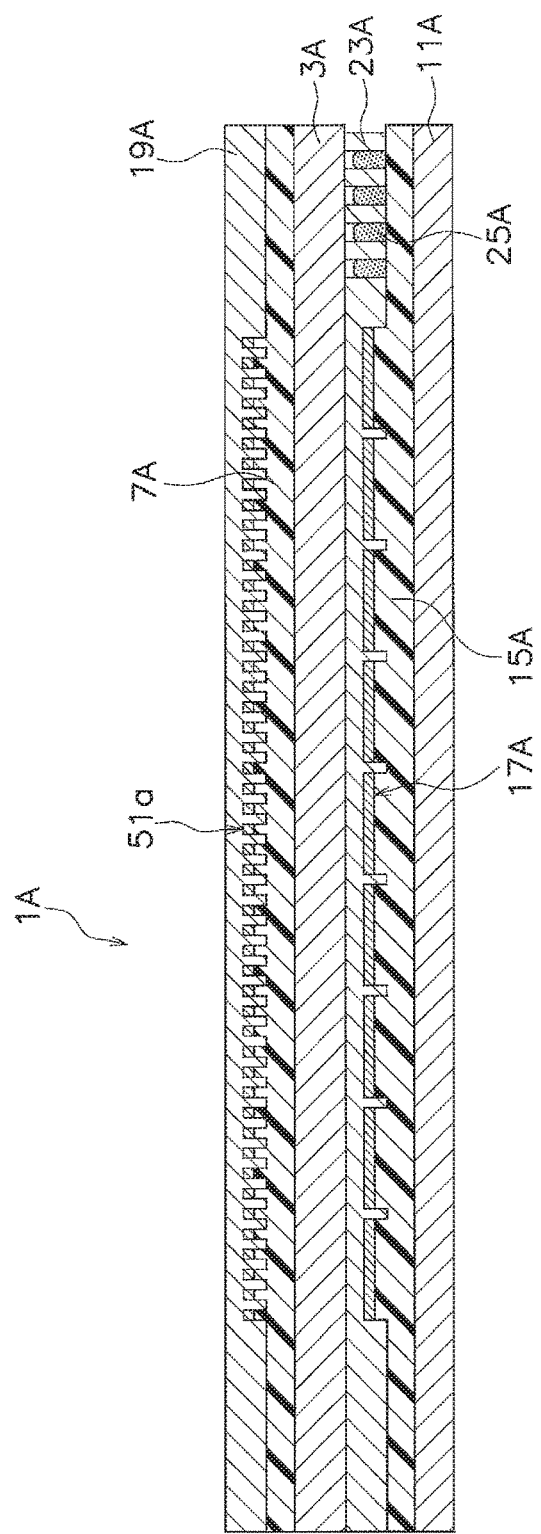
FIG. 2 is a schematic cross-sectional view of the touch panel.

A touch panel 1A according to a first embodiment will be described with reference to FIG. 1 and FIG. 2. FIG. 1 is a schematic plan view of the touch panel according to the first embodiment. FIG. 2 is a schematic cross-sectional view of the touch panel.

The touch panel 1A adopts, as basic structures, electrode patterns with rhombic or diamond lattices and a bilayered substrate structure.

The touch panel 1A is provided in an electronic device such as a multifunction cellular phone (smart phone) and a portable game machine and functions as a touch input device. In such an electronic device, the touch panel 1A is used being overlaid on a display device, for example, composed of a liquid-crystal display panel and organic EL display panel.

The touch panel 1A includes a first substrate 3A.

The touch panel 1A includes a first insulating layer 7A and a first electrode pattern 9A.

The touch panel 1A includes a second substrate 11A.

The touch panel 1A includes a second insulating layer 15A and a second electrode pattern 17A.

The touch panel 1A further includes a first PAS layer 19A, first routed wirings 21A, a second PAS layer 23A, and second routed wirings 25A.

On the first substrate 3A, the first insulating layer 7A, the first electrode pattern 9A, the first PAS layer 19A, and the first routed wirings 21A are provided. On the second substrate 11A, the second insulating layer 15A, the second electrode pattern 17A, the second PAS layer 23A, and the second routed wirings 25A are provided. Moreover, a laminated body including the first substrate 3A is disposed on a laminated body including the second substrate 11A.

The first substrate 3A is a member serving as a base for forming the first electrode pattern 9A. Preferably, the first substrate 3A is made of a material excellent in transparency, flexibility, insulating properties, and the like. Examples of the material that meets such requirements include, for example, general-purpose resin such as polyethylene terephthalate and acrylic resin; general-purpose engineering resin such as polyacetal-based resin and polycarbonate-based resin; super engineering resin such as polysulfone-based resin and polyphenylene sulfide-based resin; and the like. The thickness of the first substrate 3A may be, for example, from 25 µm to 100 µm. In the present embodiment, the first substrate 3A is composed of a polyethylene terephthalate film. The first substrate 3A may be composed of a glass substrate or the like.

The first insulating layer 7A is disposed on the first substrate 3A. Preferably, the first insulating layer 7A is made of a resin material excellent in electrical insulation. In the present embodiment, the first insulating layer 7A is mainly made of a general photosensitive resin composition.

The first electrode pattern 9A is disposed on the first insulating layer 7A. That is, the first electrode pattern 9A is disposed on the first substrate 3A with the first insulating layer 7A interposed therebetween. As illustrated in FIG. 1, the first electrode pattern 9A includes a plurality of first electrodes 9a. The plurality of first electrodes 9a extend along the X axis direction and are arranged parallel to one another so as to be arrayed in the Y axis direction. Each of the first electrodes 9a includes a plurality of first rhombic electrodes 9b arrayed along the X axis direction and connected to one another in the X axis direction.

The first PAS layer 19A entirely covers the first insulating layer 7A and the first electrode pattern 9A, and functions as an insulating rustproof layer that protects the first electrode pattern 9A. The first PAS layer 19A is mainly made of a general photosensitive resin composition.

The first electrode pattern 9A is a transparent conductive film. Specifically, the first electrode pattern 9A is, for example, metal oxide such as tin oxide, indium oxide, antimony oxide, zinc oxide, cadmium oxide, and indium tin oxide (ITO); silver nanowire, carbon nanotube, PEDOT, graphene, metal mesh, or conductive polymer. In the present embodiment, the first electrode pattern 9A is composed of the silver nanowire.

From a viewpoint of the problem of the pattern appearance, which is to be solved by the present disclosure, it is the PEDOT, the carbon nanotube, and the silver nanowire that particularly requires the present disclosure. A reason for the above is as follows. The two former materials are colored, and the silver nanowire is transparent, but still each thereof looks whitish as a result of reflection depending on a material and color of the depth thereof.

The respective first electrodes 9a are connected to the first routed wirings 21A. Each of the first routed wirings 21A is mainly composed of conductive ink made of ink containing conductive particles of metal such as gold, silver, copper, nickel and palladium; or of carbon. A material of the conductive particles which constitute the conductive ink may be of a single type or a combination of a plurality of types. In the present embodiment, the first routed wirings 21A are mainly composed of conductive ink containing silver nanoparticles.

The second substrate 11A, the second PAS layer 23A, the second routed wirings 25A, the second insulating layer 15A, and the second electrode pattern 17A include similar configurations to those of the first substrate 3A, the first PAS layer 19A and the first routed wirings 21A except specific configurations regarding a shape and arrangement of the second electrode pattern 17A.

As illustrated in FIG. 1, the second electrode pattern 17A includes a plurality of second electrodes 17a. The plurality of second electrodes 17a extend along the Y axis direction and are arranged parallel to one another so as to be arrayed in the X axis direction. Each of the second electrodes 17a includes a plurality of second rhombic electrodes 17b arrayed along the Y axis direction intersecting the X axis direction (perpendicularly in the present example) and connected to one another in the Y axis direction.

As illustrated in FIG. 1, the plurality of first rhombic electrodes 9b which constitute the first electrode pattern 9A and the plurality of second rhombic electrodes 17b which constitute the second electrode pattern 17A are arranged in a complementary positional relationship in a plan view. That is, the first electrode pattern 9A and the second electrode pattern 17A are arranged so as to cover, as a whole, the substantially entire display region of the display device.

The first routed wiring 21A is provided on a peripheral edge portion in the first substrate 3A in a plan view. The first routed wirings 21A are arranged on one side in the X axis direction with respect to an arrangement region of the first electrode pattern 9A. The first routed wirings 21A extend parallel to one another along the Y axis direction.

The second routed wirings 25A are provided on a peripheral edge portion in the second substrate 11A in a plan view. The second routed wirings 25A are arranged on one side in the Y axis direction with respect to an arrangement region of the second electrode pattern 17A. The second routed wirings 25A extend parallel to one another along the X axis direction. End portions of the first routed wirings 21A and the second routed wirings 25A are provided with a plurality of external connection terminals 29A for connecting the first electrode pattern 9A and the second electrode pattern 17A to an external controller.

A current that flows in response to changes in electrostatic capacitance, which occur in the first electrode pattern 9A and the second electrode pattern 17A, is sensed by the controller, whereby a touch operation by a user and a position touched by the user can be detected.

(2) Dummy Electrode

Figure 3:
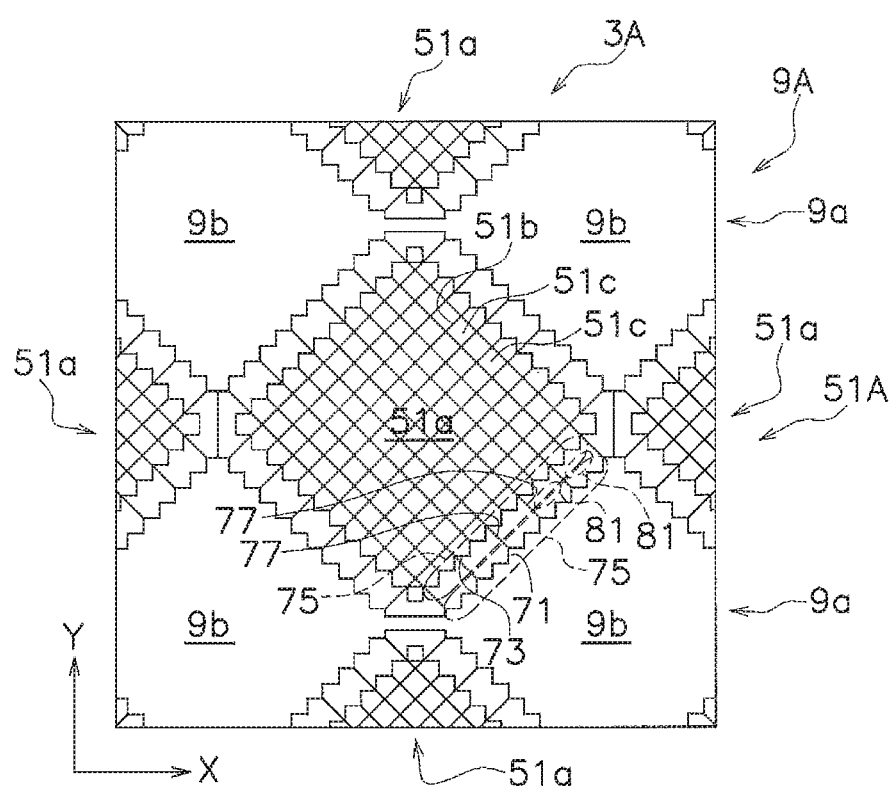
FIG. 3 is a schematic partial plan view of a first electrode pattern.
Figure 4:
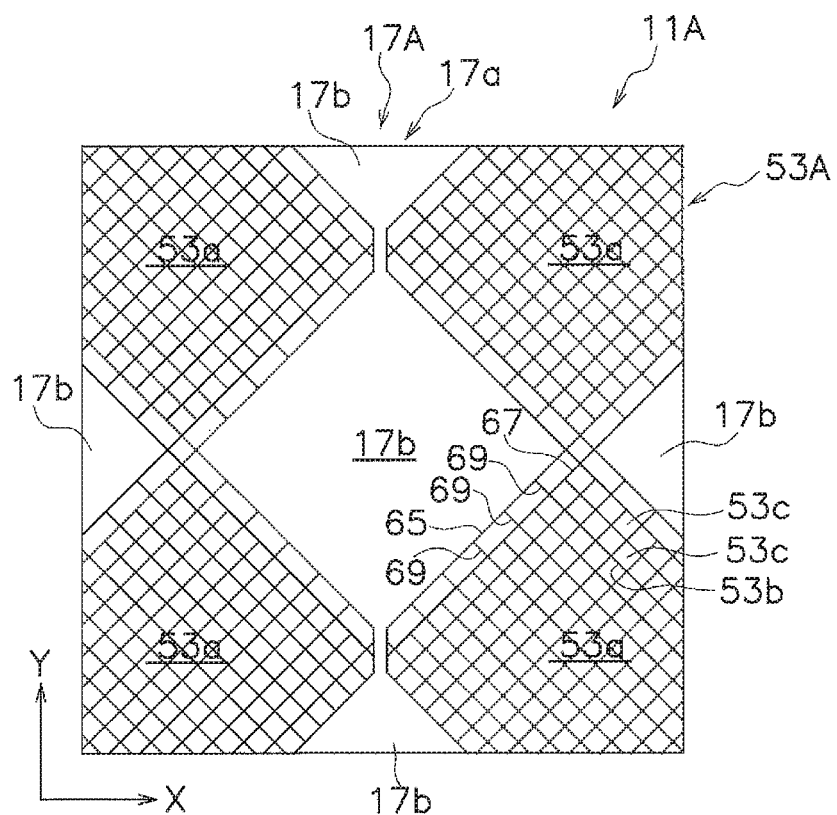
FIG. 4 is a schematic partial plan view of a second electrode pattern.
Figure 5:
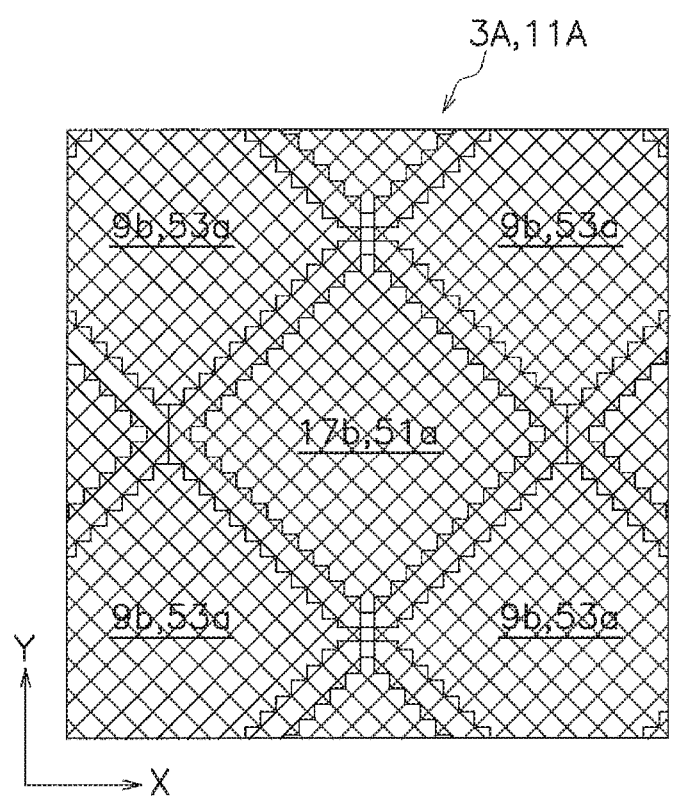
FIG. 5 is a schematic partial plan view of the first electrode pattern and the second electrode pattern.
Figure 6:
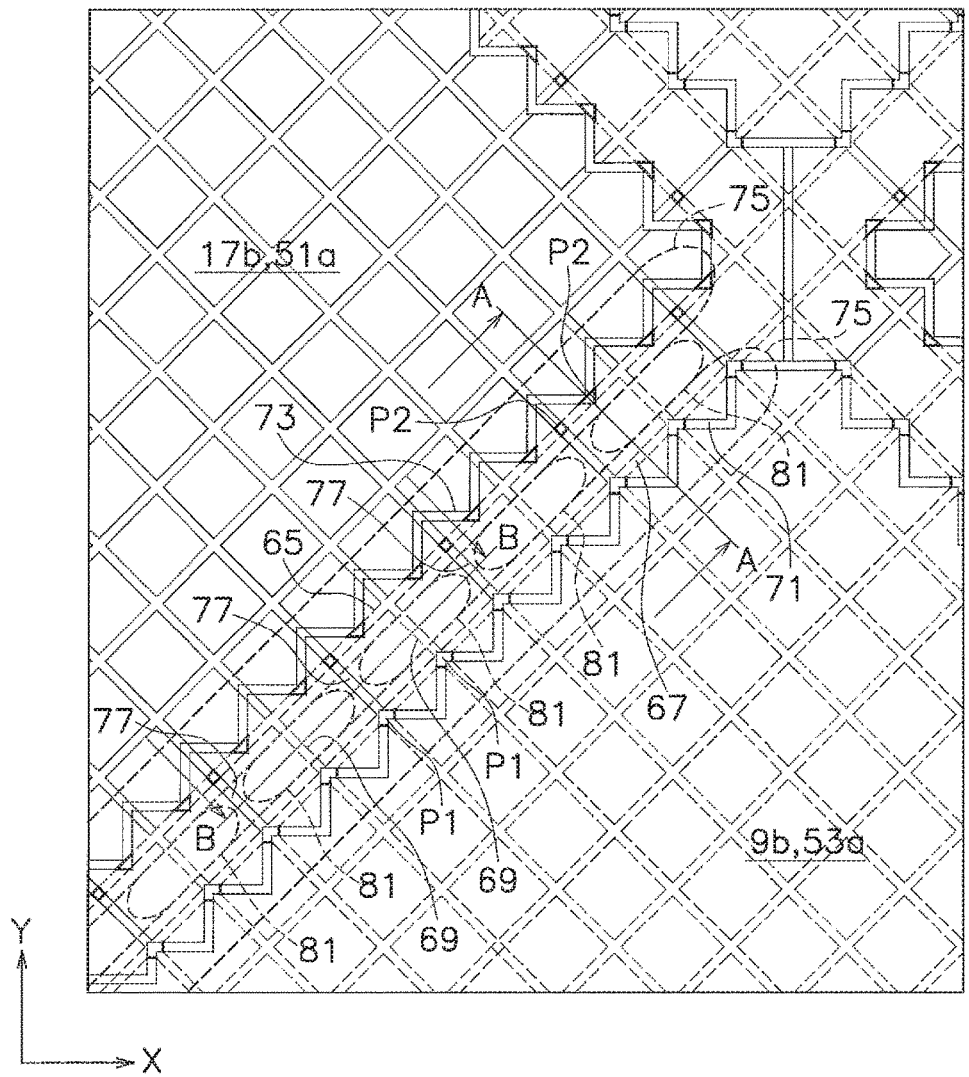
FIG. 6 is a partial enlarged view of FIG. 5.

Referring to FIG. 3 to FIG. 7, a first dummy electrode pattern 51A and a second dummy electrode pattern 53A will be described. FIG. 3 is a schematic partial plan view of the first electrode pattern. FIG. 4 is a schematic partial plan view of the second electrode pattern. FIG. 5 is a schematic partial plan view of the first electrode pattern and the second electrode pattern. FIG. 6 is a partial enlarged view of FIG. 5. FIG. 7 is schematic views illustrating a cross-sectional structure of an arrow portion in FIG. 6.

As illustrated in FIG. 3, the first dummy electrode pattern 51A is formed in a region in the first insulating layer 7A, where the first electrode pattern 9A is not formed. The first dummy electrode pattern 51A has similar shape and arrangement to those of the first electrode pattern 9A but is electrically insulated from the first electrode pattern 9A. The entirety of the first insulating layer 7A is covered with the first electrode pattern 9A and the first dummy electrode pattern 51A. Hence, the pattern appearance of the first electrode pattern 9A can be reduced. In order to reduce the pattern appearance, preferably, the first dummy electrode pattern 51A is made of the same material as that of the first electrode pattern 9A.

The first dummy electrode pattern 51A includes a plurality of first dummy electrodes 51a. The respective first dummy electrodes 51a are rhombic electrodes formed in regions where the plurality of first rhombic electrodes 9b are not formed. Each of the first dummy electrodes 51a is divided into a plurality of minute regions 51c by first slits (gaps) 51b formed in a lattice shape. As described above, each first dummy electrode 51a of the first dummy electrode pattern 51A is formed as a pattern of minute islands in comparison with each first rhombic electrode 9b of the first electrode pattern 9A, whereby parasitic capacitance generated in the first dummy electrode pattern 51A can be reduced.

As illustrated in FIG. 4, the second dummy electrode pattern 53A is formed in a region in the second insulating layer 15A, where the second electrode pattern 17A is not formed. The second dummy electrode pattern 53A has similar shape and arrangement to those of the second electrode pattern 17A but is electrically insulated from the second electrode pattern 17A. The entirety of the second insulating layer 15A is covered with the second electrode pattern 17A and the second dummy electrode pattern 53A, and accordingly, the pattern appearance of the second electrode pattern 17A can be reduced. In order to reduce the pattern appearance, preferably, the second dummy electrode pattern 53A is made of the same material as that of the second electrode pattern 17A.

The second dummy electrode pattern 53A includes a plurality of second dummy electrodes 53a. The respective second dummy electrodes 53a are rhombic electrodes formed in regions where the plurality of second rhombic electrodes 17b are not formed. Each of the second dummy electrodes 53a is divided into a plurality of minute regions 53c by second slits 53b formed in a lattice shape. As described above, each second dummy electrode 53a of the second dummy electrode pattern 53A is formed as a pattern of minute islands in comparison with each second rhombic electrode 17b of the second electrode pattern 17B, whereby parasitic capacitance generated in the second dummy electrode pattern 53A can be reduced.

Since the second rhombic electrode 17b is formed at a plan position corresponding to the first dummy electrode 51a, a major section of the first slit 51b is not "a portion where no electrode material is formed in a plan view". Moreover, since the first rhombic electrode 9b is formed at a plan position corresponding to the second dummy electrode 53a, a section of the second slit 53b is not "a portion where no electrode material is formed in a plan view".

However, in a plan view, in a boundary portion between the first dummy electrode 51a and the first rhombic electrode 9b and a boundary portion between the second dummy electrode 53a and the second rhombic electrode 17b, a portion (outermost portion) where the first slit 51b of the first dummy electrode pattern 51A is formed and a portion (outermost portion) where the second slit 53b of the second dummy electrode pattern 53A is formed overlap each other. Accordingly, there is a problem that "portions where no electrode material is formed in a plan view" occur by overlap among the first slit 51b, the second slit 53b, and other gaps at the above-described section.

(3) Cover Portion of Second Dummy Electrode Pattern

A structure for reducing the above-described problem will be described.

The second dummy electrode pattern 53A includes cover portions (to be described later) corresponding to edge portions of the plurality of first dummy electrodes 51a of the first dummy electrode pattern 51A, whereby "portions where neither the first dummy electrode pattern 51A nor the second dummy electrode pattern 53A is formed in a plan view" are reduced. As a result, the pattern appearance is further reduced.

The cover portion of the second dummy electrode pattern 53A will be specifically described next.

(3-1) First Cover Portion

As illustrated in FIG. 4, outermost ones of the plurality of minute regions 53c of the second dummy electrode 53a include an outermost first gap 65 and a second gap 67 (which is a part of the second slit 53b) disposed parallel to and inward of the first gap 65. The first gap 65 is a gap between the plurality of second dummy electrodes 53a and the adjacent first rhombic electrodes 9b. The second gap 67 is a gap between an outermost minute region 53c and a minute region 53c inside the outermost minute region 53c. Each of the first gap 65 and the second gap 67 has a linear shape and extends along a side of the second dummy electrode 53a.

As illustrated in FIG. 3 and FIG. 6, outermost ones of the plurality of minute regions 51c of the first dummy electrode 51a include an outermost third gap 71 and a fourth gap 73 (which is a part of the first slit 51b) disposed parallel to and inward of the third gap 71. Each of the third gap 71 and the fourth gap 73 constitutes a zig-zag shape portion, constituting a first cover portion 75, by which the first gap 65 and second gap 67 of each of the plurality of second dummy electrodes 53a are covered. Each of the third gap 71 and the fourth gap 73 has a zig-zag shape and extends along a side of the second dummy electrode 53a. The third gap 71 is formed at a position corresponding to the second gap 67, and the fourth gap 73 is formed at a position corresponding to the first gap 65.

The "zig-zag shape" herein is a shape formed in such a manner that a plurality of mount shapes are joined together. As a result, as illustrated in FIG. 6, a portion where the third gap 71 and the second gap 67 overlap each other in a plan view is a plurality of dotted regions P1, and further, portions where the fourth gap 73 and the first gap 65 overlap each other in a plan view are a plurality of dotted regions P2.

Even if an error in pasting occurs, such an arrangement relationship as described above maintains a structure in which the portion where neither the first dummy electrode pattern 51A nor the second dummy electrode pattern 53A is formed (that is, "a portion where no electrode material is formed in a plan view") is the plurality of dotted regions. That is, the above-described portion is not generated as a line region.

When the electrode material is silver nanowire, a portion where the electrode material is formed looks whitish, and the "portion where no electrode material is formed" looks black. However, the portion that looks black is merely a plurality of points thanks to the above-described configuration, and accordingly, a difference therebetween is not very conspicuous.

Figures 7A, 7B:
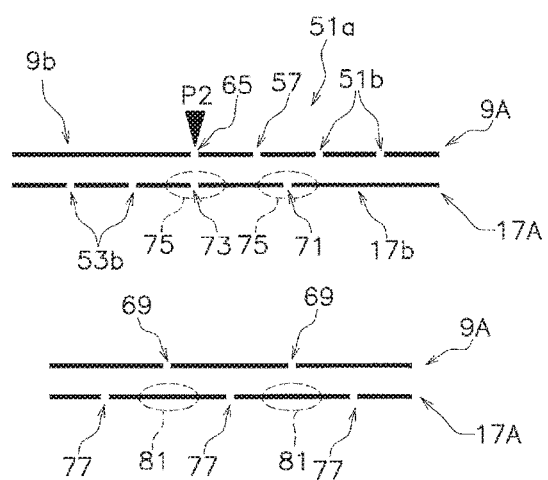
FIG. 7A is schematic views illustrating an A-A cross-sectional structure of FIG. 6, illustrating one dotted region P2.
FIG. 7B is a B-B cross section of FIG. 6, where the dotted regions P are not illustrated.

FIG. 7A is an A-A cross section of FIG. 6, illustrating one dotted region P2.

FIG. 7B is a B-B cross section of FIG. 6, where the dotted regions P are not illustrated.

As a first example different from the present embodiment, for example, a case is conceived where the third gap 71 and the fourth gap 73 are linear and respectively overlap the first gap 65 and the second gap 67. Then, the "region where no electrode material is formed in a plan view" may be formed in a linear manner.

(3-1) Second Cover Portion

The second dummy electrode 53a includes a plurality of fifth gaps 69. The plurality of fifth gaps 69 extend between the first gap 65 and the second gap 67. That is, the plurality of fifth gaps 69 are arrayed in a direction where a side of the first dummy electrode 51a extends and extend in a direction perpendicular to the side of the second dummy electrode 53a.

The first dummy electrode 51a includes a plurality of sixth gaps 77. The plurality of sixth gaps 77 extend between the third gap 71 and the fourth gap 73. That is, the plurality of sixth gaps 77 are arrayed in a direction where the side of the second dummy electrode 53a extends and extend in the direction perpendicular to the side of the second dummy electrode 53a. The plurality of sixth gaps 77 are formed at intermediate positions between the plurality of fifth gaps 69. Portions between the plurality of sixth gaps 77 constitute second cover portions 81, by which the plurality of fifth gaps 69 are covered. As a result, the fifth gaps 69 and the sixth gaps 77 do not overlap each other in a plan view.

Even if the fifth gaps 69 and the sixth gaps 77 deviate from scheduled positions thereof due to an error in pasting, such an arrangement relationship as described above makes it difficult for the fifth gaps 69 and the sixth gaps 77 to overlap each other in a plan view. That is, the portion is less likely to occur where neither the first dummy electrode pattern 51A nor the second dummy electrode pattern 53A is formed (that is, "portion where no electrode material is formed in a plan view".

As a second example different from the present embodiment, for example, a case is conceived where the second dummy electrode pattern 53A includes linear gaps at positions corresponding to the fifth gaps 69, and the linear gaps overlap the fifth gaps 69. Then, the "region where no electrode material is formed in a plan view" may be formed linearly.

(4) Modified Example of First Embodiment

In the above-described embodiment, the description is given of the touch panel in which the respective electrode patterns are formed on two substrates; however, the present disclosure can also be applied to a touch panel in which the respective electrode patterns are formed on both surfaces of one substrate.

Figure 8:
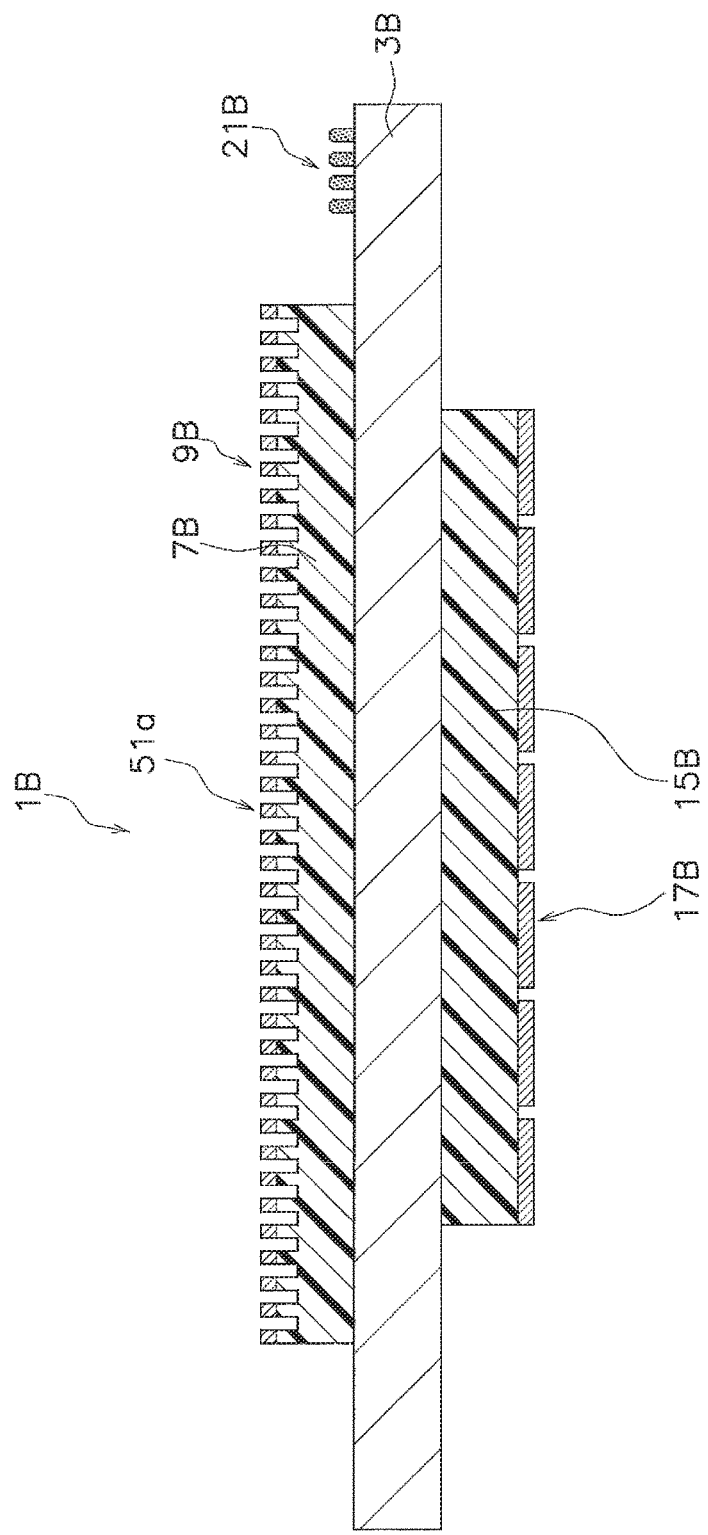
FIG. 8 is a schematic plan view of a touch panel according to a modified example.

Hereinafter, such a modified example will be described with reference to FIG. 8. FIG. 8 is a schematic plan view of a touch panel according to the modified example.

A touch panel 1B adopts, as basic structures, electrode patterns with rhombic lattices and a single-layered substrate structure.

The touch panel 1B includes a transparent substrate 3B.

The touch panel 1B includes a first insulating layer 7B and a first electrode pattern 9B.

The touch panel 1B includes a second insulating layer 15B and a second electrode pattern 17B.

The touch panel 1B includes first routed wirings 21B and second routed wirings (not illustrated).

The first insulating layer 7B, the first electrode pattern 9B and the first routed wirings 21B are provided on one surface of the transparent substrate 3B, and the second insulating layer 15B, the second electrode pattern 17B and the second routed wirings are provided on the other surface of the transparent substrate 3B. As described above, the touch panel 1B includes the first electrode pattern 9B and the second electrode pattern 17B on both surfaces of the one transparent substrate 3B, whereby the entirety of a sensor is thinned.

2. Second Embodiment (1) Basic Configuration of Touch Panel

Figure 9:
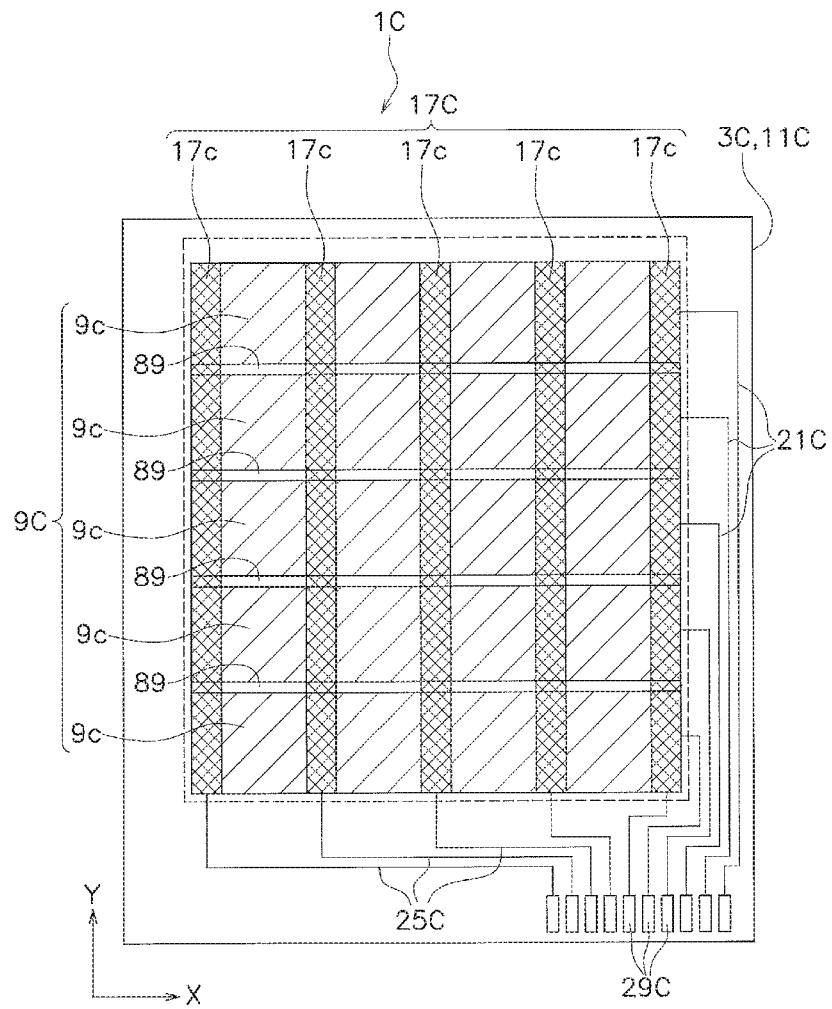
FIG. 9 is a schematic plan view of a touch panel according to a second embodiment.
Figure 10:
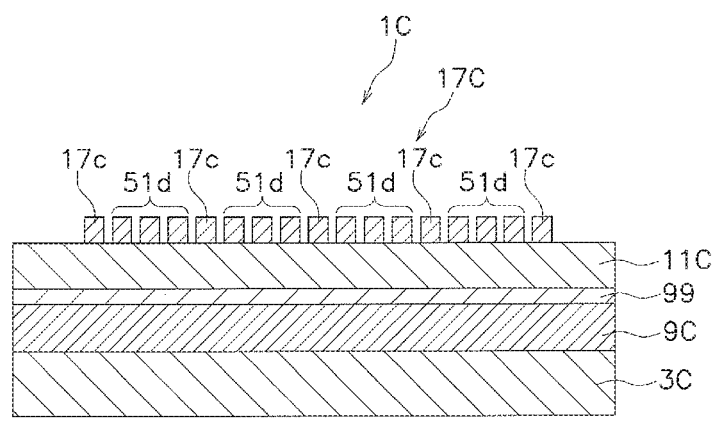
FIG. 10 is a schematic cross-sectional view of the touch panel.

A touch panel 1C according to a second embodiment will be described with reference to FIG. 9 and FIG. 10. FIG. 9 is a schematic plan view of the touch panel according to the second embodiment. FIG. 10 is a schematic cross-sectional view of the touch panel.

The touch panel 1C adopts, as basic structures, electrode patterns with linear or belt-shaped lattices and a bilayered substrate structure.

The touch panel 1C includes a first substrate 3C and a first electrode pattern 9C formed thereon.

The touch panel 1C includes a second substrate 11C and a second electrode pattern 17C formed thereon.

The touch panel 1C further includes first routed wirings 21C and second routed wirings 25C.

Moreover, a laminated body including the first substrate 3C is disposed on a laminated body including the second substrate 11C with an adhesive layer 99 interposed therebetween.

Figure 11:
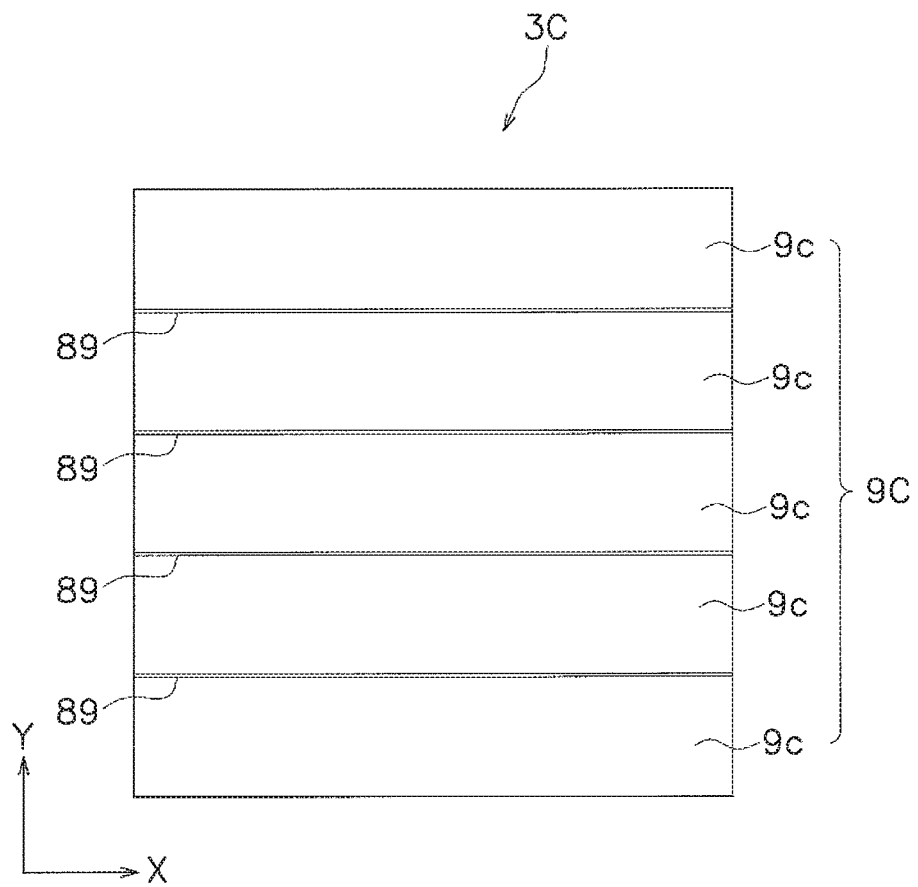
FIG. 11 is a schematic partial plan view of a first electrode pattern.

As illustrated in FIG. 9 and FIG. 11, the first electrode pattern 9C includes a plurality of strip-shaped first electrodes 9c arrayed along the Y axis direction. Each of the first electrodes 9c is formed so as to extend along the X axis direction as a whole. The plurality of first electrodes 9c are arranged parallel to one another so as to be arrayed in the Y axis direction.

Gaps 89 are formed between the first electrodes 9c. A width of the gaps 89 is extremely shorter than a width of the first electrodes 9c.

The second electrode pattern 17C includes a plurality of strip-shaped second electrodes 17c arrayed along the X axis direction. Each of the second electrodes 17c is formed so as to extend along the Y axis direction as a whole. The plurality of second electrodes 17c are arranged parallel to one another so as to be arrayed in the X axis direction.

The first routed wirings 21C are provided on a peripheral edge portion in the first substrate 3C in a plan view. The first routed wirings 21C are provided on one side in the X axis direction with respect to an arrangement region of the first electrode pattern 9C. The first routed wirings 21C extend parallel to one another along the Y axis direction. In the present embodiment, the second routed wirings 25C are provided on a peripheral edge portion in the second substrate 11C in a plan view. The second routed wirings 25C are provided on one side in the Y axis direction with respect to an arrangement region of the second electrode pattern 17C. The second routed wirings 25C extend parallel to one another along the X axis direction. End portions of the first routed wirings 21C and the second routed wirings 25C are provided with a plurality of external connection terminals 29C for connecting the first electrode pattern 9C and the second electrode pattern 17C to an external controller.

A current that flows in response to changes in electrostatic capacitance, which occur in the first electrode pattern 9C and the second electrode pattern 17C, is sensed by the controller, whereby a touch operation by a user and a position touched by the user can be detected.

(2) Dummy Electrode

Figure 12:
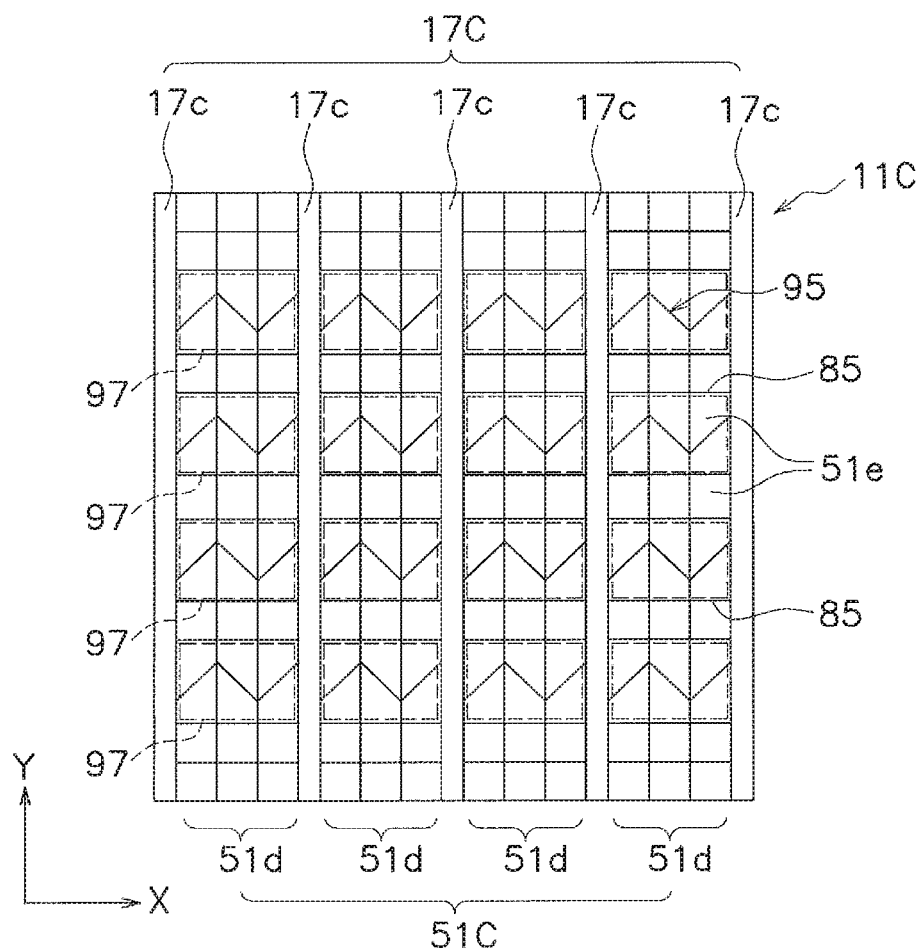
FIG. 12 is a schematic partial plan view of a second electrode pattern.
Figure 13:
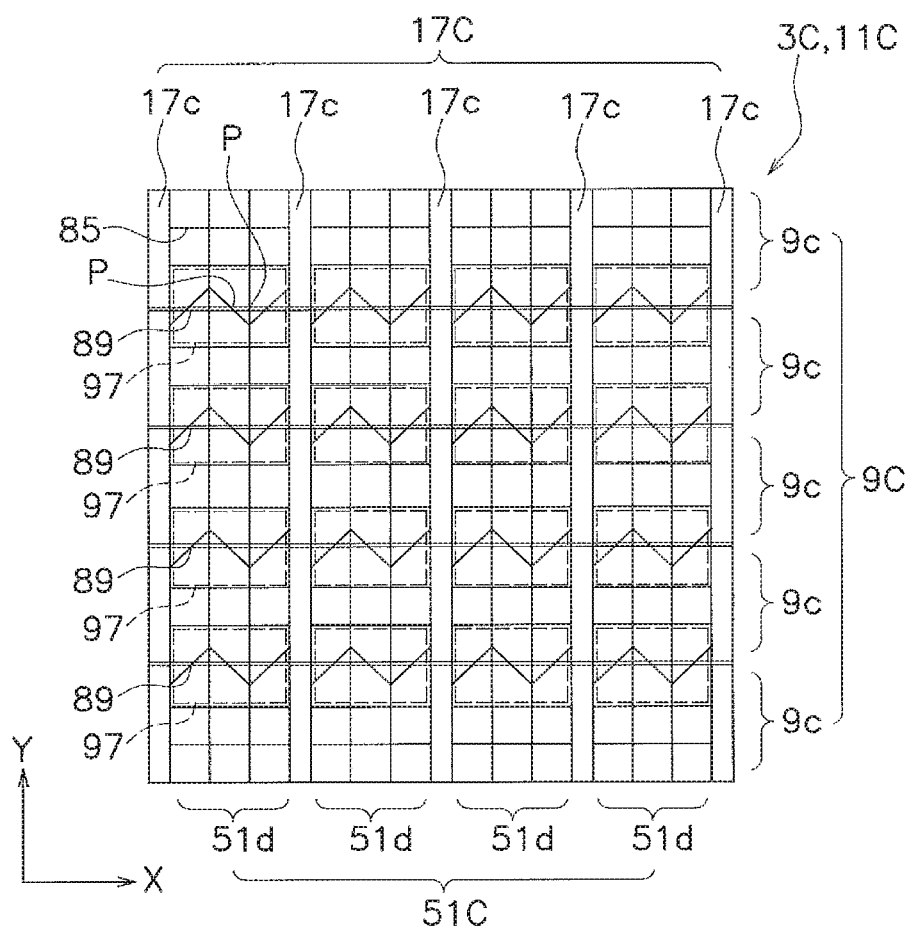
FIG. 13 is a schematic partial plan view of the first electrode pattern and the second electrode pattern.
Figure 14:
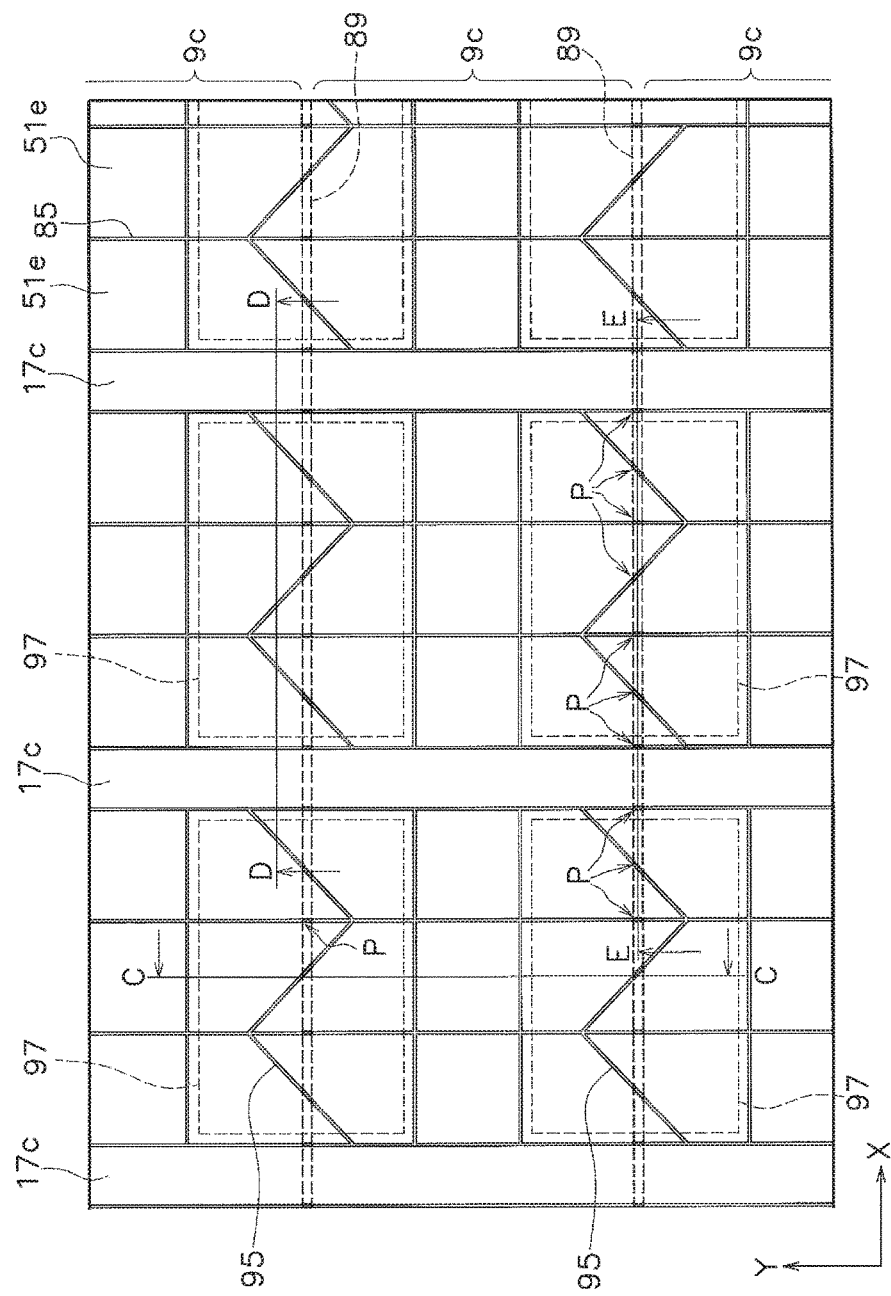
FIG. 14 is a partial enlarged view of FIG. 13.

Referring to FIG. 11 to FIG. 15, a dummy electrode pattern 51C will be described. FIG. 11 is a schematic partial plan view of the first electrode pattern. FIG. 12 is a schematic partial plan view of the second electrode pattern. FIG. 13 is a schematic partial plan view of the first electrode pattern and the second electrode pattern. FIG. 14 is a partial enlarged view of FIG. 13. FIG. 15 is schematic views illustrating a cross-sectional structure of an arrow portion in FIG. 14.

As illustrated in FIG. 12, the dummy electrode pattern 51C is formed in a region in the second substrate 11C, where the second electrode pattern 17C is not formed.

The dummy electrode pattern 51C includes a plurality of dummy electrodes 51d. The plurality of dummy electrodes 51d are arrayed along the X axis direction. The dummy electrodes 51d are arranged so as not to be connected to the second electrodes 17c and the other dummy electrodes 51d physically or electrically.

Each of the dummy electrodes 51d of the dummy electrode pattern 51C is divided into a plurality of minute regions 51e by first gaps 85. As described above, each dummy electrode 51d is formed as a pattern of minute islands in comparison with each first electrode 9c, whereby parasitic capacitance generated in the dummy electrode pattern 51C can be reduced.

Note that most of the gaps 89 of the first electrodes 9c of the first electrode pattern 9C is covered with the second electrode pattern 17C and the dummy electrode pattern 51C. Hence, a major section of the gaps 89 is covered with other electrode members in a plan view. However, a section where each of the first gaps 85 of the dummy electrode pattern 51C overlaps the gap 89 in a plan view becomes "the portion where no electrode material is formed in a plan view".

(3) Cover Portion of Dummy Electrode Pattern

A structure for reducing the above-described problem will be described.

The dummy electrode pattern 51C includes cover portions (to be described later) corresponding to the gaps 89 between the first electrodes 9c of the first electrode pattern 9C, whereby the portion where neither the first electrode pattern 9C nor the dummy electrode pattern 51C is formed in a plan view (that is, "the portion where no electrode material is formed in a plan view") is reduced. As a result, the pattern appearance is reduced.

The plurality of gaps 89 between the plurality of first electrodes 9c are linear. By zig-zag shape portions corresponding to the plurality of gaps 89, gaps 95 (which are a part of the first gaps 85) between the plurality of dummy electrodes 51d constitute third cover portions 97 around the gaps 95, and the third cover portions 97 cover the plurality of gaps 89 between the plurality of first electrodes 9c. As a result, portions where the gaps 89 and the gaps 95 overlap each other in a plan view are a plurality of dotted regions P.

Even if an error in pasting occurs, such an arrangement relationship as described above maintains a structure in which the portion where neither the first electrode pattern 9C nor the dummy electrode pattern 51C is formed (that is, "the portion where no electrode material is formed in a plan view") is the plurality of dotted regions P as illustrated in FIG. 13 and FIG. 14. That is, the above-described portion does not appear as a line region.

Figure 15A:
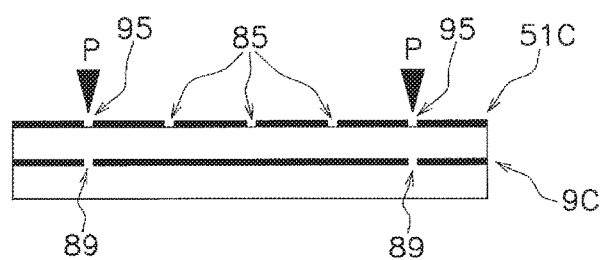
FIG. 15A is a C-C cross section of FIG. 14, illustrating two dotted region P.

FIG. 15A is a C-C cross section of FIG. 14, illustrating two dotted region P.

Figure 15B:
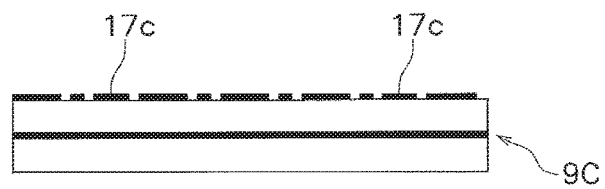
FIG. 15B is a D-D cross section of FIG. 14, where the dotted regions P are not illustrated.

FIG. 15B is a D-D cross section of FIG. 14, where the dotted regions P are not illustrated.

Figure 15C:
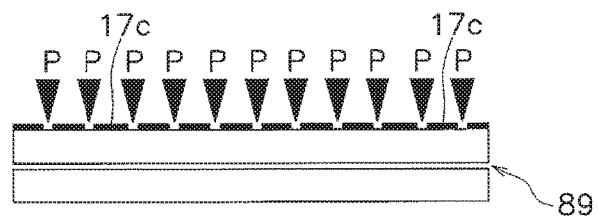
FIG. 15C is an E-E cross section of FIG. 14, where a large number of the dotted regions P are illustrated.

FIG. 15C is an E-E cross section of FIG. 14, where a large number of the dotted regions P are illustrated.

As a third example different from the present embodiment, for example, a case is conceived where the dummy electrode 51d includes linear gaps at positions corresponding to the plurality of gaps 89, and the linear gaps overlap the gaps 89. Then, the "region where no electrode material is formed in a plan view" may be formed linearly in FIG. 15C.

(4) Modified Example of Second Embodiment (4-1) First Modified Example

In the above-described embodiment, the description is given of the touch panel in which the respective electrode patterns are formed on two substrates; however, the present disclosure can also be applied to a touch panel in which the respective electrode patterns are formed on both surfaces of one substrate.

Figure 16:
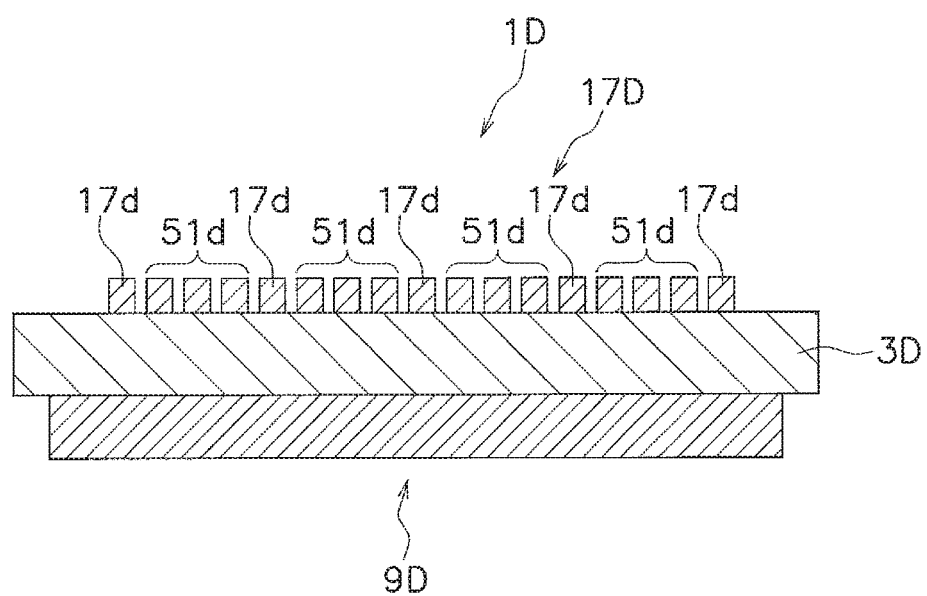
FIG. 16 is a schematic plan view of a touch panel according to a modified example.

Hereinafter, such a modified example will be described with reference to FIG. 16. FIG. 16 is a schematic plan view of a touch panel according to the modified example.

A touch panel 1D adopts, as basic structures, electrode patterns with linear lattices and a single-layered substrate structure.

The touch panel 1D includes a transparent substrate 3D, a first electrode pattern 9D formed on one surface of the transparent substrate 3D, and a second electrode pattern 17D formed on the other surface of the transparent substrate 3D.

The touch panel 1D includes the first electrode pattern 9D and the second electrode pattern 17D on both surfaces of the one transparent substrate 3D, whereby the entirety of a sensor is thinned.

(4-2) Second Modified Example

In the second embodiment, the cover portion is formed of the zig-zag shape gap; however, may be formed of other shape.

Figure 17:
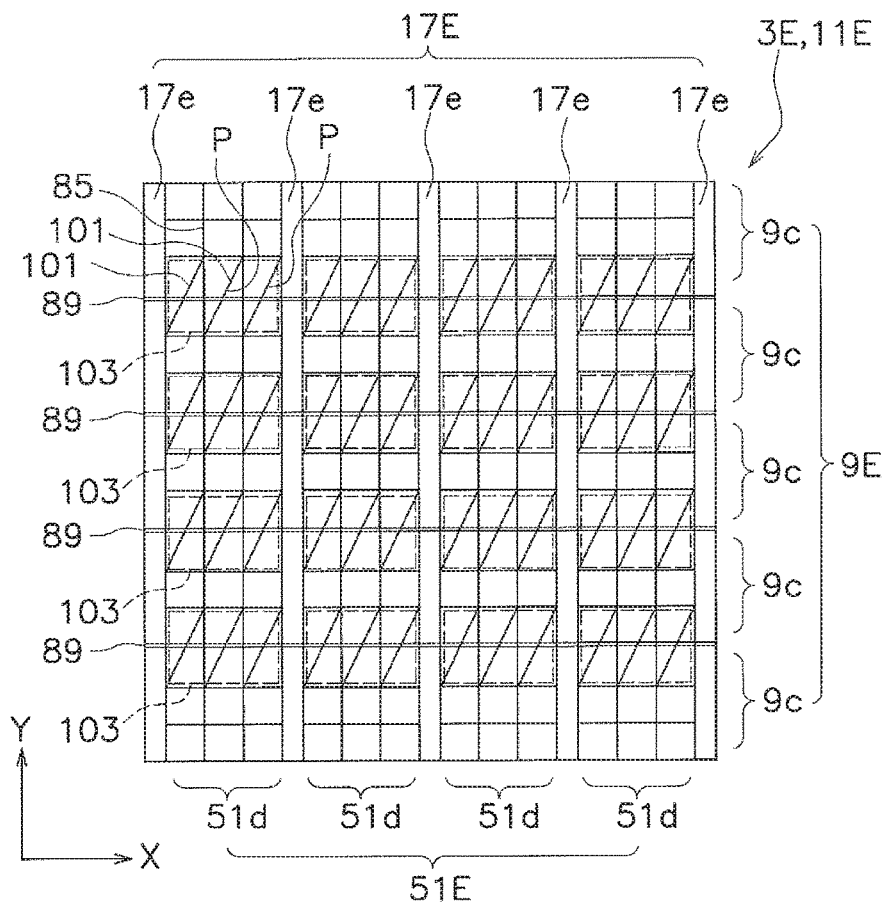
FIG. 17 is a schematic partial plan view of the first electrode pattern and the second electrode pattern according to the modified example.

A modified example of the cover portion will be described with reference to FIG. 17. FIG. 17 is a schematic partial plan view of a first electrode pattern and a second electrode pattern according to the modified example.

By a plurality of diagonal line portions corresponding to the plurality of gaps 89, gaps 101 (which are a part of the first gaps 85) between the plurality of dummy electrodes 51d of a dummy electrode pattern 51E constitute third cover portions 103 around the gaps 101, and the third cover portions 103 cover the plurality of gaps 89 between the plurality of first electrodes 9c. As a result, portions where the gaps 89 and the gaps 101 overlap each other in a plan view are the plurality of dotted regions P.

The plurality of gaps 101 are formed alternately with linear gaps extending in the Y axis direction and are inclined to the same side, and hence, have a large inclination angle with respect to the gaps 89. In this way, an area of portions where the gaps 101 and the gaps 89 intersect each other is small.

Even if an error in pasting occurs, such an arrangement relationship as described above maintains a structure in which the portions where neither a first electrode pattern 9E nor the dummy electrode pattern 51E is formed (that is, "portions where no electrode material is formed in a plan view") are the plurality of dotted regions P. That is, the above-described portion does not appear as a line region.

(4-3) Third Modified Example

Figure 18:
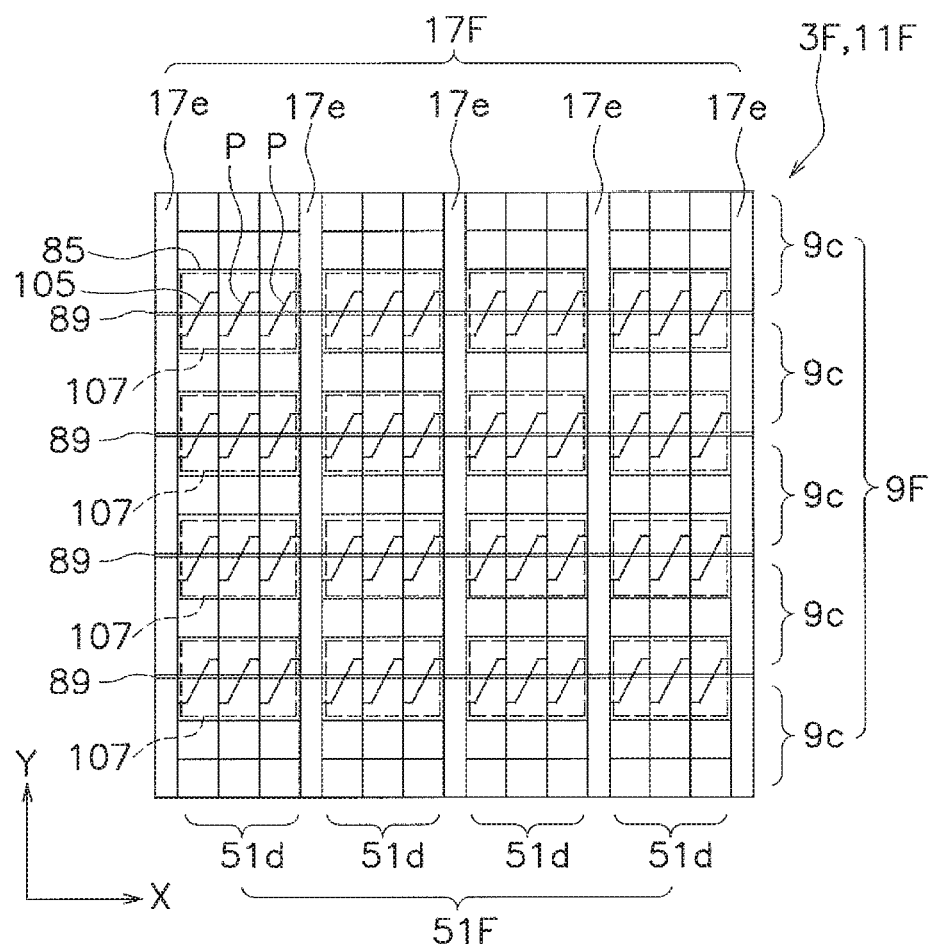
FIG. 18 is a schematic partial plan view of the first electrode pattern and the second electrode pattern according to the modified example.

A modified example of the cover portion will be described with reference to FIG. 18. FIG. 18 is a schematic partial plan view of a first electrode pattern and a second electrode pattern according to the modified example.

By a plurality of diagonal line portions corresponding to the plurality of gaps 89, gaps 105 (which are a part of the first gaps 85) between the plurality of dummy electrodes 51d of a dummy electrode pattern 51F constitute third cover portions 107 around the gaps 105, and the third cover portions 107 cover the plurality of gaps 89 between the plurality of first electrodes 9c. As a result, portions where the gaps 89 and the gaps 105 overlap each other in a plan view are the plurality of dotted regions P.

The plurality of gaps 105 are formed alternately with linear gaps extending in the Y axis direction and are inclined to the same side, and hence, have a large inclination angle with respect to the gaps 89. In this way, an area of portions where the gaps 105 and the gaps 89 intersect each other is small. Unlike those of the gaps 101 according to the second modified example, both ends of the diagonal line portions of the gaps 105 extend in the X axis direction. In this way, an angle of portions in both ends of the diagonal line portions, the portions being connected to the linear portions, is increased in comparison with that of the second modified example. Accordingly, deformation of the conductive pattern, which is caused by pattern chipping in a patterning step, is less likely to occur.

Even if an error in pasting occurs, such an arrangement relationship as described above maintains a structure in which the portions where neither the first electrode pattern 9F nor the dummy electrode pattern 51F is formed (that is, "the portions where no electrode material is formed in a plan view") are the plurality of dotted regions P. That is, the above-described portion does not appear as a line region.

(4-4) Fourth Modified Example

Figure 19:
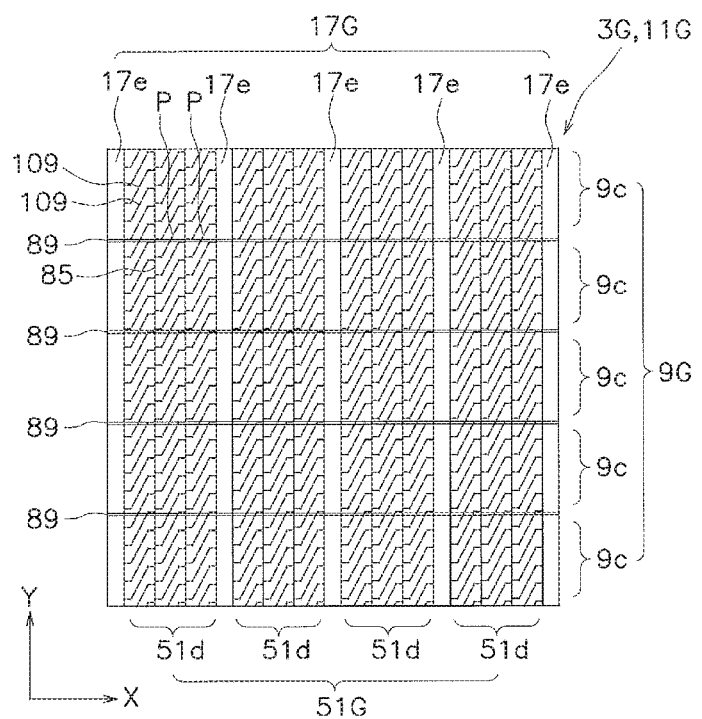
FIG. 19 is a schematic partial plan view of the first electrode pattern and the second electrode pattern according to the modified example.

A modified example of the cover portion will be described with reference to FIG. 19. FIG. 19 is a schematic partial plan view of a first electrode pattern and a second electrode pattern according to the modified example.

By a plurality of diagonal line portions corresponding to the plurality of gaps 89, gaps 109 (which are a part of the first gaps 85) between the plurality of dummy electrodes 51d of a dummy electrode pattern 51G constitute cover portions, by which the plurality of gaps 89 between the plurality of first electrodes 9c are covered.

Unlike those of the third modified example, the first gaps 85 do not have the linear portions extending in the X axis direction. The gaps 109 are a plurality of diagonal lines arrayed in the Y axis direction between a plurality of straight lines extending in the Y axis direction in the first gaps 85. The plurality of gaps 109 are inclined to the same side. From the above, the entirety of the respective dummy electrodes 51d are a third cover portion. As a result, portions where the gaps 89 and the gaps 109 overlap each other in a plan view are a plurality of dotted regions P.

More specifically, in each of the dummy electrodes 51d, three columns are formed, and the plurality of gaps 109 are arrayed in each column. However, the gaps 109 are formed while being deviated in the Y axis direction with respect to the gaps 109 in other columns. Specifically, though the gaps 109 are arranged at an equal interval in each column, a cycle thereof differs for each of the columns. Accordingly, in the respective columns, linear portions on both ends of all the gaps 109 do not coincide with one another in the Y axis direction. Hence, even if there is an error in pasting, in each column, the gaps 89 and the linear portions of the plurality of gaps 109 do not overlap each other at a plurality of sections. That is, the number of the plurality of gaps 109 which overlap the gaps 89 in each column is one at most.

Even if the gaps 89 and the gaps 109 deviate from each other due to an error in pasting occurs, there is an increased possibility that such an arrangement relationship as described above maintains a structure in which the portions where neither the first electrode pattern 9G nor the dummy electrode pattern 51G is formed (that is, "portions where no electrode material is formed in a plan view") are the plurality of dotted regions P. The arrangement relationship restricts the number of the above-described portions even if the above-described portions appear as the linear regions.

(4-5) Fifth Modified Example

Figure 20:
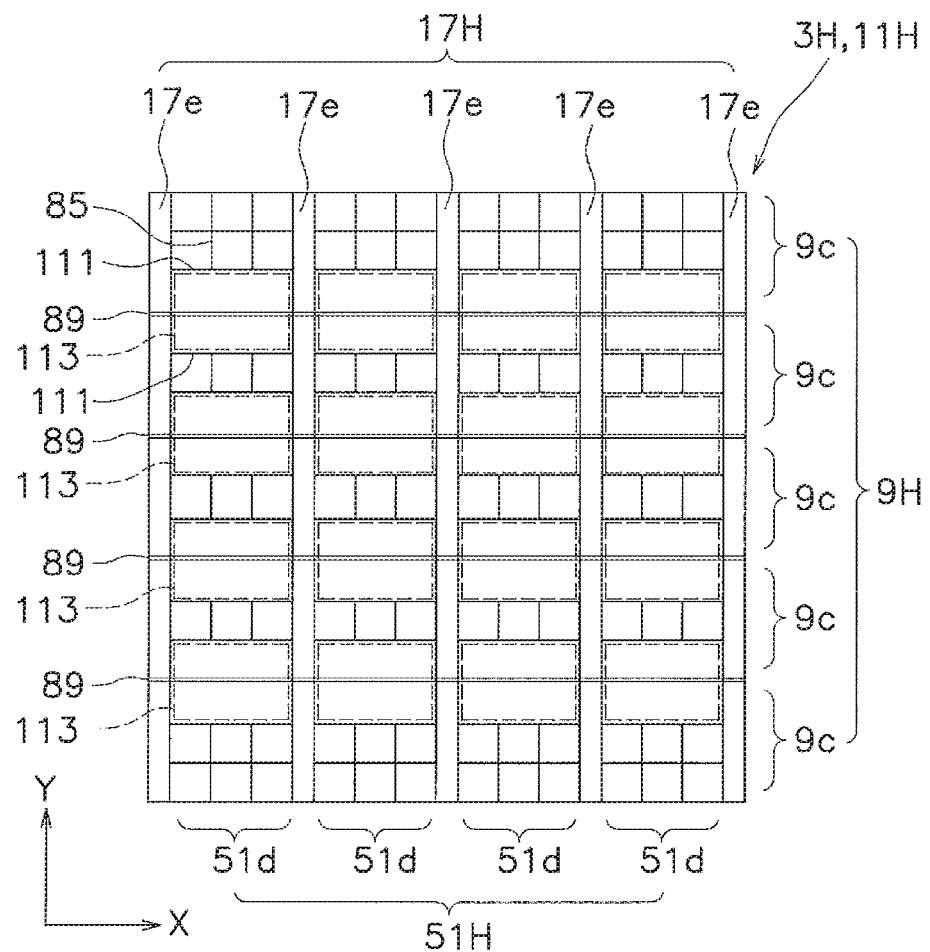
FIG. 20 is a schematic partial plan view of the first electrode pattern and the second electrode pattern according to the modified example.

In a modified example illustrated in FIG. 20, in the plurality of dummy electrodes 51d of a dummy electrode pattern 51H, portions thereof corresponding to the gaps 89 between the plurality of first electrodes 9c and to both sides of the gaps 89 in the Y axis direction constitute cover portions 113. With regard to the cover portions 113, both sides thereof in the Y axis direction are defined by gaps 111 extending in the X axis direction. FIG. 20 is a schematic partial plan view of a first electrode pattern and a second electrode pattern.

Portions between the plurality of gaps 11l constitute cover portions 113, by which the gaps 89 between the plurality of first electrodes 9c are covered.

Even if an error in pasting occurs, such an arrangement relationship as described above makes it difficult to bring about the portion where neither the first electrode pattern 9H nor the dummy electrode pattern 51H is formed (that is, "the portion where no electrode material is formed in a plan view").

3. Other Embodiments

The plurality of embodiments of the present disclosure have been described above. However, the present disclosure is not limited to the above-described embodiments and is modifiable in various ways within the scope without departing from the spirit of the disclosure. Particularly, the pluralities of embodiments and modified examples, which are described in the present description, can be arbitrarily combined with one another.

The cover portions which cover the gaps in the surfaces of the electrode patterns in the different layers may be provided on either the first electrode pattern or the second electrode pattern or may be provided on both thereof.

INDUSTRIAL APPLICABILITY

The present disclosure can be widely applied to a capacitive touch panel.

REFERENCE SIGNS LIST

1A: Touch panel
3A: First substrate
7A: First insulating layer
9A: First electrode pattern
17A: Second electrode pattern
51A: First dummy electrode pattern
51a: First dummy electrode
51b: First slit
51c: Minute region
53A: Second dummy electrode pattern
53a: Second dummy electrode
53b: Second slit
53c: Minute region
75: First cover portion
81: Second cover portion

The invention claimed is:

1. A capacitive touch panel comprising:
a single transparent substrate or a combination of a first transparent substrate and a second transparent substrate;
a first electrode pattern formed on a first surface of the transparent substrate or on one surface of the first transparent substrate;
a first dummy electrode pattern including a plurality of first dummy electrodes, each first dummy electrode having a lattice shape, and formed on a region where the first electrode pattern is not formed in the first surface of the transparent substrate or the one surface of the first transparent substrate;
a second electrode pattern formed on a second surface of the transparent substrate or on one surface of the second transparent substrate; and
a second dummy electrode pattern including a plurality of second dummy electrodes, each second dummy electrode having the lattice shape, and formed on a region where the second electrode pattern is not formed in the second surface of the transparent substrate or the one surface of the second transparent substrate,
wherein the first dummy electrodes are electrically insulated from the first electrode pattern by slits and are composed into a plurality of islands,
the second dummy electrodes are electrically insulated from the second electrode pattern by slits and are composed into a plurality of islands,
the slits of the second dummy electrodes include outermost first gaps and second gaps disposed inward of the first gaps,
the slits of the first dummy electrodes include outermost third gaps and fourth gaps disposed inward of the third gaps, and
the third gaps and the second gaps are patterned to overlap each other in a plurality of first dotted regions in a plan view, a length of a longest side of each first dotted region being shorter than a length of a shortest side of the lattice shape, and the fourth gaps and the first gaps are patterned to overlap each other in a plurality of second dotted regions in a plan view, a length of a longest side of each second dotted region being shorter than the length of the shortest side of the lattice shape.

2. The capacitive touch panel according to claim 1, wherein one of the third gaps and the second gaps is linear, and other of the third gaps and the second gaps is zig-zag, and
one of the fourth gaps and the first gaps is linear, and other of the fourth gaps and the first gaps is zig-zag.

3. The capacitive touch panel according to claim 1, wherein the plurality of second dummy electrodes include a plurality of fifth gaps which connect the first gaps and the second gaps to each other,
the plurality of first dummy electrodes include a plurality of sixth gaps which connect the third gaps and the fourth gaps to each other, and
the plurality of fifth gaps and the plurality of sixth gaps are patterned not to overlap each other in a plan view.

4. The capacitive touch panel according to claim 2, wherein the plurality of second dummy electrodes include a plurality of fifth gaps which connect the first gaps and the second gaps to each other,
the plurality of first dummy electrodes include a plurality of sixth gaps which connect the third gaps and the fourth gaps to each other, and
the plurality of fifth gaps and the plurality of sixth gaps are patterned not to overlap each other in a plan view.

5. The capacitive touch panel according to claim 3, wherein the fifth gaps and the sixth gaps are arranged alternately.

6. The capacitive touch panel according to claim 4, wherein the fifth gaps and the sixth gaps are arranged alternately.

7. A capacitive touch panel comprising:
a single transparent substrate or a first and second transparent substrates adhered to each other;
a first electrode pattern including a plurality of first electrodes formed on a first surface of the transparent substrate or on one surface of the first transparent substrate with first gaps interposed therebetween to extend in one direction;
a second electrode pattern including a plurality of second electrodes formed on a second surface of the transparent substrate or on one surface of the second transparent substrate to extend in a direction intersecting the first electrodes; and
a dummy electrode pattern including a plurality of dummy electrodes, each dummy electrode having a lattice shape, and formed on a region where the second electrode pattern is not formed in the second surface of the transparent substrate or the one surface of the second transparent substrate, wherein the dummy electrodes are composed into a plurality of islands by second gaps, and the first gaps and the second gaps are patterned to overlap each other in a plurality of dotted regions in a plan view, a length of a longest side of each dotted region being shorter than a length of a shortest side of the lattice shape.

8. The capacitive touch panel according to claim 7, wherein one of the first gaps and the second gaps is linear, and other of the first gaps and the second gaps is zig-zag.

9. The capacitive touch panel according to claim 1, wherein the lattice shape is a square shape.

10. The capacitive touch panel according to claim 1, wherein the first dotted region has a triangle shape.

11. The capacitive touch panel according to claim 7, wherein the lattice shape is a square shape.

12. The capacitive touch panel according to claim 7, wherein the dotted region has a triangle shape.

* * * * *